Figure 1:
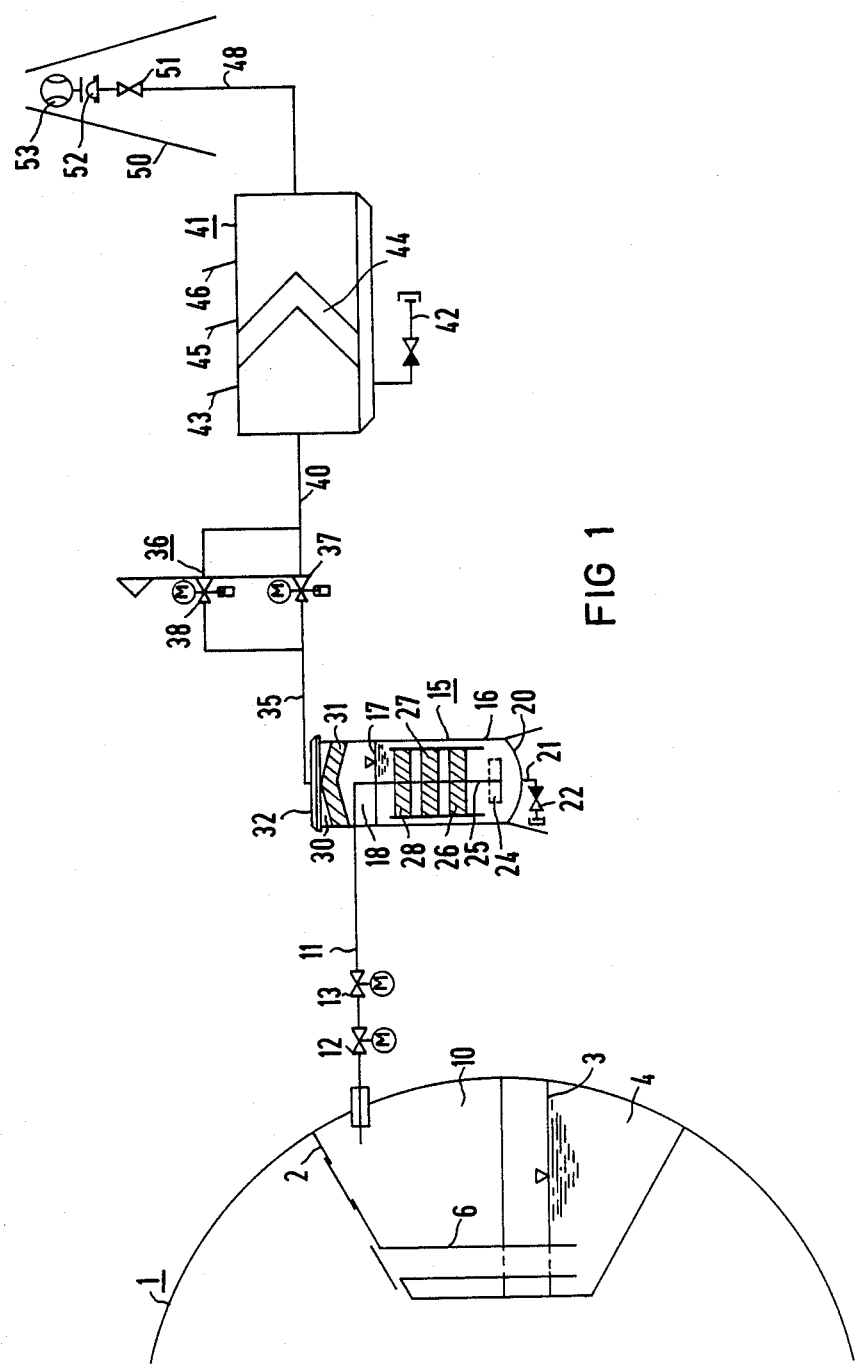

United States Patent [19]

Eckardt

[11] Patent Number: 4,873,050
[45] Date of Patent: Oct. 10, 1989

[54] METHOD AND APPARATUS FOR PRESSURE RELIEF OF A NUCLEAR POWER PLANT

[75] Inventor: Bernd Eckardt, Bruchkoebel, Fed. Rep. of Germany

[73] Assignee: Siemens Aktiengesellschaft, Munich, Fed. Rep. of Germany

[21] Appl. No.: 171,656

[22] Filed: Mar. 22, 1988

[30] Foreign Application Priority Data

Mar. 23, 1987 [DE] Fed. Rep. of Germany ....... 3709471
Sep. 3, 1987 [DE] Fed. Rep. of Germany ....... 3729501

[51] Int. Cl.$^4$ ............................ G21C 9/00; G21F 9/02
[52] U.S. Cl. ................................... 376/283; 376/309; 376/313
[58] Field of Search ................ 376/283, 313, 314, 310

[56] References Cited

U.S. PATENT DOCUMENTS

| | | | |
|---|---|---|---|
| 3,459,635 | 8/1969 | Bevilacqua et al. | 376/283 |
| 3,556,941 | 1/1971 | Takahashi | 376/283 |
| 4,057,464 | 11/1977 | Mair et al. | 376/283 |
| 4,610,840 | 9/1986 | Leach | 376/283 |
| 4,645,641 | 2/1987 | Nicolai et al. | 376/283 |
| 4,661,312 | 4/1987 | Schweiger | 376/283 |
| 4,698,202 | 10/1987 | Wachholz et al. | 376/313 |
| 4,756,872 | 7/1988 | Schoening et al. | 376/283 |

FOREIGN PATENT DOCUMENTS

| | | | |
|---|---|---|---|
| 0056830 | 8/1982 | European Pat. Off. | |
| 3212265 | 10/1983 | Fed. Rep. of Germany | |
| 0184887 | 10/1984 | Japan | 376/283 |
| 0180198 | 8/1986 | Japan | 376/314 |
| 2055241 | 2/1981 | United Kingdom | |
| 2178138 | 2/1987 | United Kingdom | |

Primary Examiner—Brooks H. Hunt
Assistant Examiner—Daniel Wasil
Attorney, Agent, or Firm—Herbert L. Lerner; Laurence A. Greenberg

[57] ABSTRACT

A method and apparatus for pressure relief of a nuclear power plant includes the feeding of fluid from an outlet opening of a containment through a filter to a stack. The filter is operated with sliding pressure regulated as a function of the pressure in the containment.

19 Claims, 8 Drawing Sheets

METHOD AND APPARATUS FOR PRESSURE RELIEF OF A NUCLEAR POWER PLANT

The invention relates to a method and apparatus for pressure relief of a nuclear power plant having a containment with an outlet opening and a filter connected to the outlet opening which communicates with an exhaust stack.

A device of this type is set forth in co-pending U.S. application Ser. No. 118,751, filed Nov. 5, 1987.

Such pressure relief can only be useful in malfunction situations which are so extreme that they have been considered as unlikely. Since the necessity of pressure relief is extremely improbable, it is particularly advantageous to reduce the expense required theretofore.

It is accordingly an object of the invention to provide a method and apparatus for pressure relief of a nuclear power plant, which overcomes the hereinafore-mentioned disadvantages of the heretofore-known methods and devices of this general type and which reduces the expense of the pressure relief. The invention is also intended to be equally well suited for use under the various possible preconditions for pressure relief in order to decontaminate the media leaving the containment.

With the foregoing and other objects in view there is provided, in accordance with the invention, a method for pressure relief of a nuclear power plant, which comprises feeding fluid from an outlet opening of a containment through a filter to a stack, and operating the filter with sliding pressure regulated as a function of the pressure in the containment. The higher the pressure, the greater the throughput with only slightly reduced filter action. Smaller filters and narrower lines, fixtures and the like are therefore adequate.

The filtration can be performed with different filters, which are used in succession. Advantageously, in two stages, a first coarser filter element can be used for moisture filtration as well and can be backwashed, while a second filter element, preferably having a metal fiber coating 2 to 4 $\mu$m thick for the retention of superfine aerosols for a decontamination factor of from 1000 to 10,000, can be operated in a dry state. This two-stage filtration is also well suited to the situation in which cleaning with wet scrubbers is performed beforehand.

For operation using a combination of wet scrubbers and filters, in particular high-output special steel fiber pre-filters as water filters and superfine aerosol post-filters, with sliding overpressure operation, it is possible to attain a highly effective aerosol and iodine retention from the overpressure gases flowing out of the containment (containment venting), while having a compact structure.

Since the pressure relief is coupled with the overpressure of the containment according to the invention, the maximum relief is obtained at maximum pressure load of the containment by means of the maximum outlet flow. In this case, the wet scrubber can provide for extensive collection of the coarse aerosols. A cleaning of more than 99%, for particles of over one micrometer in size, is attained. For fine aerosols as well, a high collection rate of more than 80%, for example, is attained.

By means of an admixture of alkaline substances with the washing fluid, iodine absorption in the washing fluid can be attained. Due to the gas compression, a maximum mass imposition then takes place. This permits minimum cross sections of flow lines and small quantities of washing fluid. The pressure in the gas scrubber, which is adapted to the pressure of the containment, also prevents the evaporation of washing fluid, so that long-term self-sufficiency in terms of washing fluid replenishment is attained.

The sliding pressure can be regulated passively with a critical slackening of pressure for a uniform throughput, so that the action of a gas scrubber, if applicable, as well as the filter, is always within optimal limits in terms of speed. The wet scrubber and filter can be acted upon by the same pressure. The invention can also be put into practice with different pressures, however, in order to obtain specific flow distributions.

Wet scrubbers and/or filters can be operated at an elevated temperature, preferably above 100° C. Under some circumstances, the heat required for this purpose and for pre-inertizing can also be drawn from the containment that is to be pressure-relieved, through a heat transfer circuit having nitrogen and water vapor.

With the objects of the invention in view, there is also provided in a nuclear power plant having a containment with an outlet opening formed therein, a filter connected downstream of the outlet opening, and a stack connected downstream of the filter, a pressure relief apparatus comprising a pressure regulating device disposed between the filter and the stack for operating the filter with sliding pressure regulated as a function of the pressure in the containment. The pressure regulating device may be a throttle device that leads into a space having atmospheric pressure. Preferably the throttle device is constructed for operation in the range of the speed of sound (critical relaxation of pressure), because in that way an overload of the components by an excessively high gas speed can be avoided.

The wet scrubber and the filter can be disposed on a common housing, the filter advantageously being mounted on the outside vessel wall. As a result, the constructional expense can be kept particularly low. Since the vessel is intended to carry the pressure of the containment, it can be advantageous for it to be accommodated in the containment, so that virtually no differential pressure acts upon the vessel wall.

The wet scrubber is preferably in the form of a Venturi scrubber which is known in the art. However, the novelty and particularly advantage is the provision of a "shortened" form of the Venturi scrubber, which has a ratio of height to throat width of a maximum of 20 and preferably approximately 10. The maximum height should not exceed 100 cm and the throat width should not exceed 5 cm. Baffle filters above the Venturi scrubbers, especially in the washing fluid, are recommended.

The filter includes porous material and preferably includes both a metal fiber filter as a superfine filter and a preceding mist collector. The inlet region of an associated filter vessel can be constructed in such a way that a low speed in the so-called empty tubes permits good large-droplet mist collection. To this end, the flow cross section between the wet scrubber and the filter can, for instance, be a multiple of the inlet cross section leading into the wet scrubber.

The superfine mist collection required for droplets of up to one micrometer in diameter is performed with a metal-fiber pre-filter stage or with a filter of porous ceramic. The retention of superfine aerosols takes place in the metal-fiber superfine filter stage which follows directly, a short distance afterward. Due to the overpressure operation in the superfine filter unit, there is a slightly reduced degree of filtering, at the same oncoming flow velocity and with operation at 5 bar, for example, practically only in the superfine aerosol range. However, this can be compensated for as needed, such as by a pre-treatment or post-treatment. The reduction caused by the increased pressure in a preceding wet scrubber is thus compensated for virtually completely in the overall action.

The moisture filter stage acting optionally as a pre-filter can be provided by means of a fine filter material coating, in such a way that together with the preceding Venturi scrubber, not only the superfine droplet collection but a highly effective superfine aerosol collection takes place at the same time, so that decontamination factors even greater than 100 are attained over the entire pressure range.

Furthermore, the problem of increased dust concentration, which arises particularly in overpressure operation of low-bed metal fiber filters and which in the presence of correspondingly small filter surface areas easily leads to exceeding the dust storage capacity of such filters, is reliably avoided by the retention of the relevant amounts of dust in a wet scrubber The trapping of the majority of the activities in a pre-filter or in the wet scrubber and the partial rinsing of the activities from the pre-filter/mist collector portion into the washing fluid or condensate return line, produce the advantage of activity deposition in fluids of relatively low quantity (a blowing off of activity in the event of throughput increases is avoided), as well as optimal residual heat removal options, resulting in a general increase in operating safety.

A subsequently connected throttle device operating in the Laval velocity range, which is advantageously equipped with a supersonic diffuser, also assures adequate relief of the containment passively at maximum malfunctional relief pressure, and assures that the permissible gas velocities in the activity retention device are not exceeded. Furthermore, especially in the presence of high concentrations of hydrogen, the possibility of $O_2$ incursions can be avoided reliably by providing continuous overpressure in the process, and a suitable disposition of the throttle and nozzle device permits safe liberation of hydrogen into the environment by utilizing the compression energies without using combustion devices.

For wet scrubbing, the introduction of other chemicals besides the alkaline substances mentioned for iodine absorption, influences the surface tension and thus the atomization of droplets and aerosols in such a way as to attain increased degrees of filtration.

Other features which are considered as characteristic for the invention are set forth in the appended claims.

Although the invention is illustrated and described herein as embodied in a method and apparatus for pressure relief of a nuclear power plant, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

FIG. 1 is a diagrammatic and schematic circuit diagram of a pressure relief apparatus in a boiling water reactor;

FIG. 2 is a view similar to FIG. 1 of a modified pressure relief apparatus, which is again in a boiling water reactor;

FIG. 3 is a diagrammatic, cross-sectional view of a vessel having a wet scrubber and a metal fiber filter unit integrated with the wet scrubber;

FIG. 4 is another view similar to FIG. 1 of a pressure relief apparatus for a pressurized water reactor;

FIG. 5 is a further view similar to FIG. 1 of a pressure relief apparatus of a pressurized water reactor having a separate scrubber and filter;

FIG. 6 is an added view similar to FIG. 1 of a pressure relief apparatus of a boiling water reactor with dry filters without gas scrubbing;

FIG. 7 is an enlarged, partly broken-away elevational view of the vessel having dry filters according to in FIG. 6;

FIG. 8 is a fragmentary, elevational view showing a disposition of Venturi scrubbers, such as can be used in the lower portion of the vessel of FIG. 3; and FIG. 9 is a view similar to FIG. 8 showing the Venturi scrubbers of FIG. 8 having a lower washing fluid level.

Referring now to the figures of the drawings in detail and first, particularly, to FIG. 1 thereof, there is seen a boiling water reactor for producing electricity, having a capacity of 1000 MWE, for example, which is represented by a spherical containment 1 containing nuclear components. An annular condensation chamber 2 is partitioned off in the containment 1 and is filled with water 4 up to a water level 3. Blow-off tubes 6 lead into the condensation chamber 2, so that steam arising during a malfunction in the containment 1 can be carried into the water 4 and thereby condensed.

An outlet line 11 which is connected to an air space 10 above the surface 3 of the water, has two series-connected shutoff valves 12 and 13. The line 11 has a diameter of 300 mm and leads into a wet scrubber 15.

The wet scrubber 15 has a cylindrical vessel 16 which is filled with washing water 18 up to a water level 17. The surface or level 17 of the liquid is located at approximately three-quarters of the vessel height. An outlet line 21 is disposed in the bottom 20 of the vessel 16 and is normally closed with a shutoff valve 22.

In the vicinity of the bottom 20, outlet nozzles 24 are disposed at the end of an inlet line 25, so that the steam and gas volume vented from the containment for pressure relief is introduced from there into the washing fluid 18. The gas volume passes through three mutually spaced-apart filter elements 26, 27 and 28, during its course upward through the washing fluid. As a result, radioactive aerosols are washed out and decontamination is attained.

A mist collector 31 is provided in an air space 30 above the water surface or level 17. The mist collector 31 is a coarse filter having a conical configuration, so that the collected droplets run down along the inner wall of the vessel 16 and return to the washing fluid 18.

An outlet line 35 is connected to a lid 32 of the vessel 16. The outlet line leads to a pressure regulating device 36 having two throttle valves 37 and 38 disposed parallel to one another. The throttle valves provide for a relaxation of the overpressure prevailing in the containment 1 from a maximum of 5 bar, for instance, to atmospheric pressure.

Downstream of the pressure regulating or throttle device 36, an outlet line 40 having a rated width of 800 mm leads into a fine filter 41. The fine filter is provided with an outlet line 42. A pressure measuring gauge 43 is disposed upstream of a filter insert 44. A temperature measuring point 45 is provided downstream of the filter insert 44. A measuring point 46 for oxygen is also provided. Superfine aerosols up to a size of 1 $\mu$m or less are filtered out in the fine filter 41. The filter 41 increases the decontamination factor, which is the quotient of the aerosol concentration on the raw gas side and the pure gas side, providing a measure of effectiveness of the filtering device.

An outlet line 48 which also has a rated width of 800 mm, leads out of the fine filter 41 into a stack 50. The outlet line is provided with a shutoff valve 51 and is closed with a bursting disk 52 for normal situations. The bursting disk 52 has a response pressure of 5 bar, for example. A jet pump 53 which is also disposed in the stack 50, performs safe mixing of hydrogen for distribution into the atmosphere.

Figure 2:
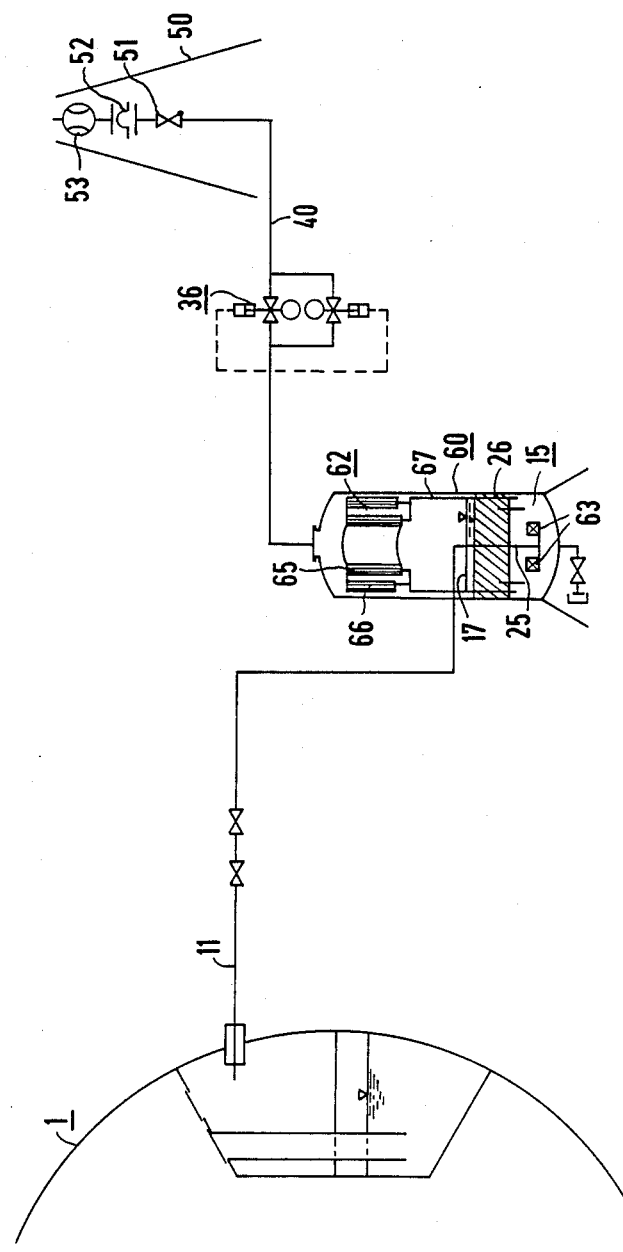

In the embodiment of FIG. 2, the outlet line 11 connected to the containment 1 leads into a vessel 60 in the form of an integrated scrubber/filter unit in which a fine filter is built-in in the form of an integrated filter unit 62. The water level 17 in the FIG. 2 embodiment is located in the lower half of the vessel. The end of the inlet line 25 is constructed in the form of Venturi scrubbers 63. For this reason, only a single filter 26 is provided below the water level 17, although its height is increased.

The filter unit 62 includes a coarse stage 65 and a fine stage 66 concentrically surrounding the coarse stage. Both stages are in the form of metal-fiber filters. The water collected in the filters is returned to the region beneath the filter 26 through a line 67.

The pressure regulating or throttle device 36, which serves to reduce the internal pressure of the containment 1 present in the vessel 60 to atmospheric pressure, is constructed in such a way that the same maximum gas quantity always reaches the outlet line 40. This quantity of gas then escapes through the shutoff valve 51, constructed in the form of a flap, once the bursting disk 52 has responded and the outlet of the line 40 has opened.

Figure 3:
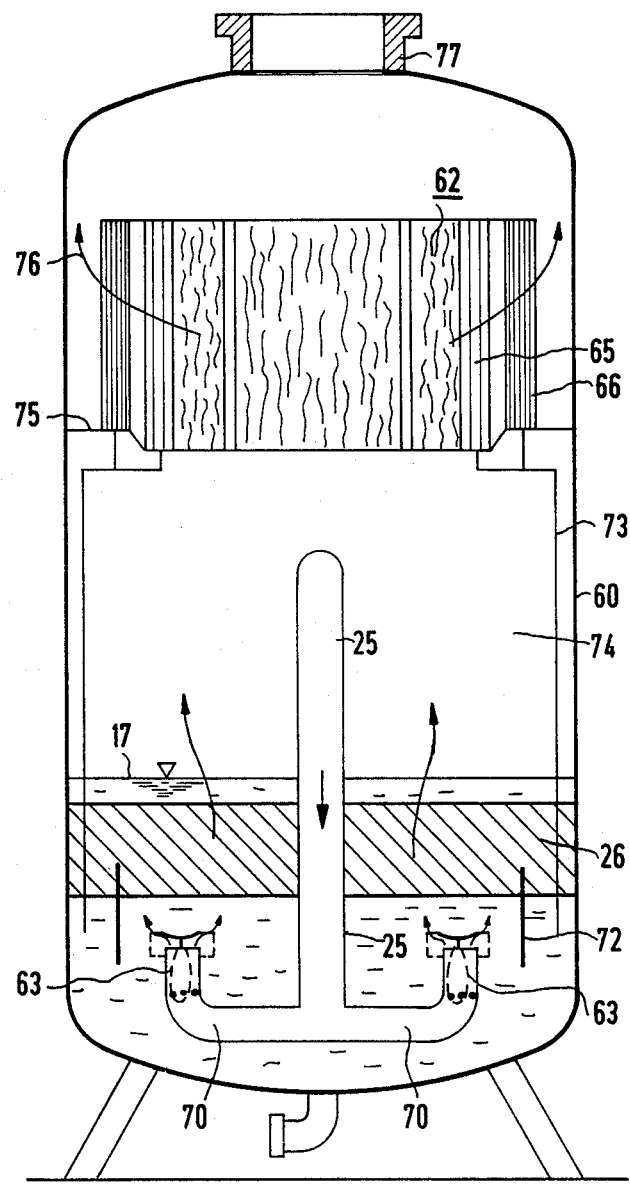

In FIG. 3, the integrated scrubber/filter/vessel 60 is shown in a cross section on a larger scale. It is more clearly apparent from FIG. 3 that the end of the inlet line 25 leads through a plurality of arms 70 to individual Venturi scrubbers 63. The gas-air mixture rising from the Venturi scrubbers 63 is carried through a cylindrical wall 72 into the middle region of the filter 26. Return lines 73 for the washing fluid from the filter unit 62 are provided above the fluid level 17. As the drawing shows, the cross section of the vessel 60 is many times larger than that of the inlet line 25. As a result, only a low gas velocity prevails downstream of the filter 25. The entrainment of liquid is thereby avoided.

The filter unit 62 with its filter portions 65 and 66 is mounted on a bracket 75. The bracket 75 closes off the space above the filter 62, so that gases are carried to an outlet 77 in the direction of arrows 76.

Figure 4:
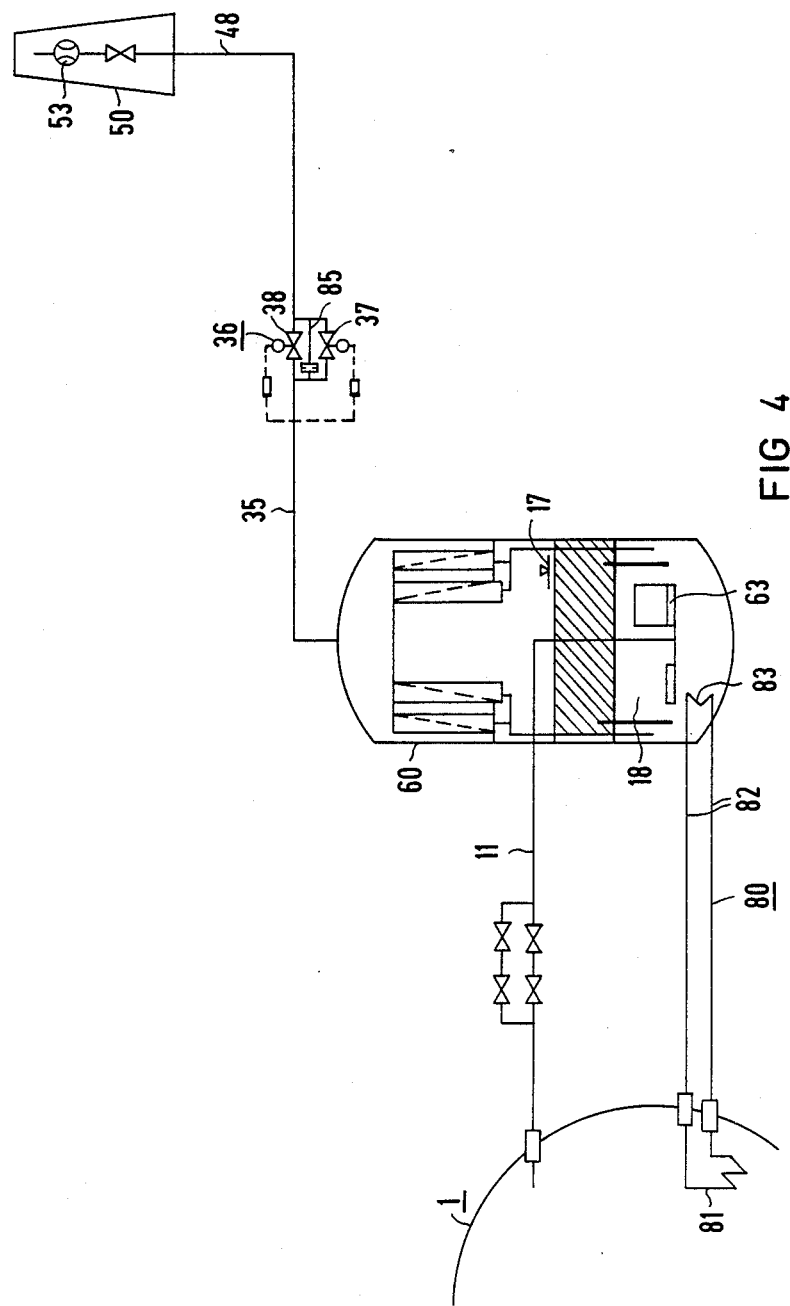

In the embodiment of FIG. 4, the integrated scrubber/filter unit 60 is connected to the containment 1 of a pressurized water reactor. The washing fluid 18 is heated below the fluid level 17 by means of a heating circuit 80, which is in the form of a thermosiphon. The heating circuit 80 includes a heat exchanger 81 in the interior of the containment. The heat exchanger 81 communicates with a heat exchanger 83 below the Venturi scrubbers 63 through lines 82.

The pressure regulating device 36 is constructed in the form of a Laval throttle restriction in such a way that diverted gases flow at the speed of sound, to the maximum extent. Parallel to the throttle valves 37 and 38, a segment 85 is provided for limiting the quantity of inertizing gases.

Figure 5:
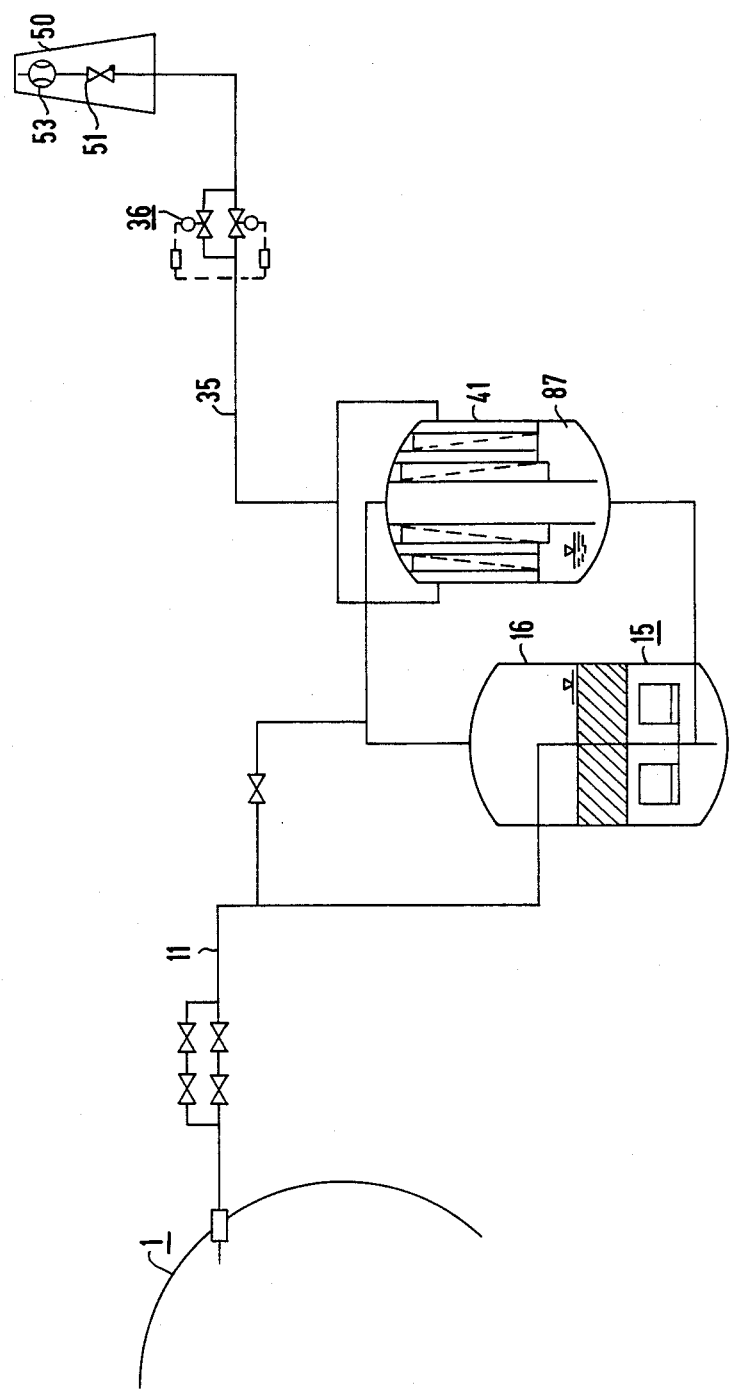

In the embodiment of FIG. 5, the pressure relief apparatus is once again connected to the reactor containment 1 of a pressurized water reactor. However, similar to the embodiment of FIG. 1, the wet scrubber 15 is provided separately from the superfine filter 41. A line leads back into the vessel 16 from a housing 87.

Figure 6:
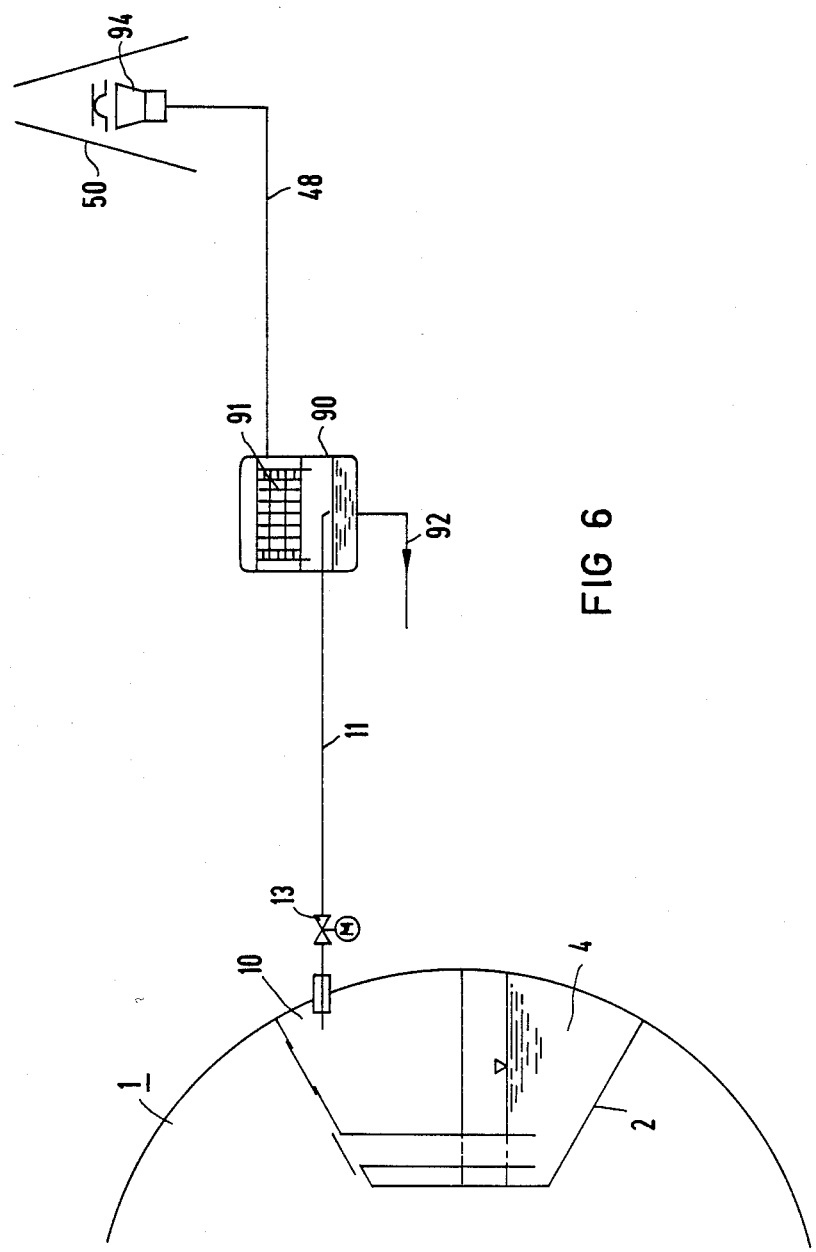

Furthermore, the wet scrubber 15 can also be omitted so that only one filter is then present, which is acted upon with sliding pressure in accordance with the overpressure in the containment 1. Sliding pressure means that the filter is connected to the containment as directly as possible and without any members which would operate to cause a pressure loss. Therefore, the throttle is downstream and not upstream of the filter. One example of this is shown in FIG. 6 for a boiling water reactor. The outlet line 11 which is connected to the gas space 10 of the condensation chamber 2 and has the shutoff valve 13, is disposed at an incline for condensate outflow and leads into a vessel 90 having filters 91 which are operated with sliding pressure. A condensate return line 92, which is provided with suitable means for regulation, leads from the bottom of the vessel 90, which is shown in further detail in FIG. 7, to a collecting vessel, or through check valves into the water volume 4 of the condensation chamber 2. The outlet line 48 leads through a quantity limiter 94 in the form of a Laval nozzle, into the stack 50. Logically, the pressure relief apparatus of FIG. 6 can be used for the containment of a pressurized water reactor as well.

Figure 7:
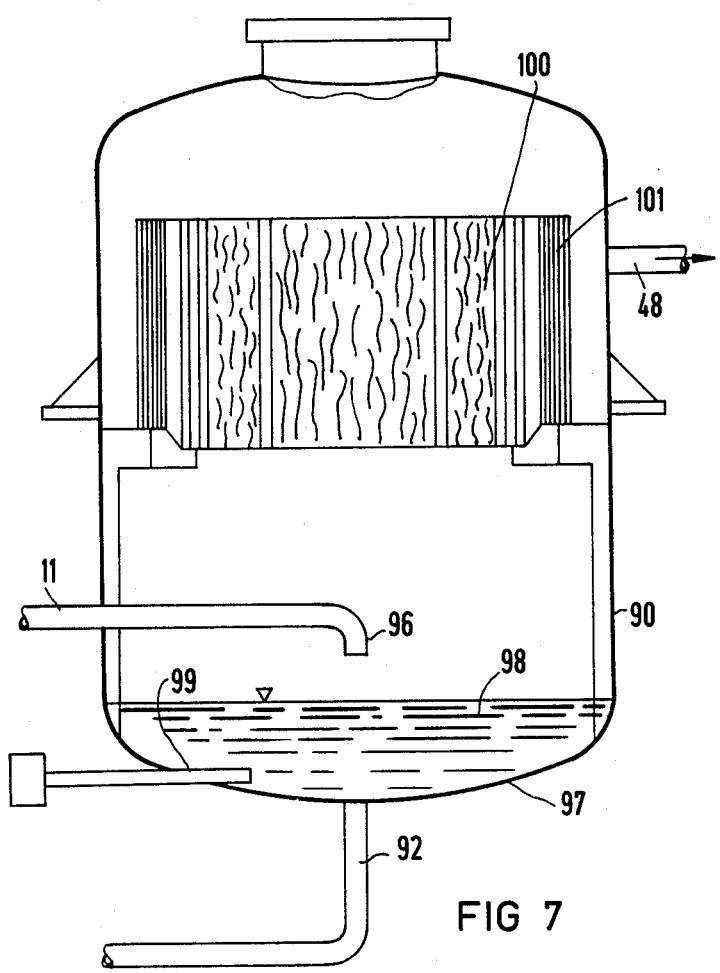

The vessel 90 has a diameter of 2.5 meters, for example, and an approximately equally great height. As shown in FIG. 7, leading into the lower half of the vessel 90 is the line 11, which terminates in the center with a downwardly oriented elbow 96. The vessel bottom 97 is covered with condensate 98, which is kept at a temperature of approximately 100° C. by heating means 99, in order to avoid an increasing concentration of hydrogen.

In the upper half of the vessel 90, a pre-filter 100 and a fine filter 101 are disposed concentrically. The pre-filter 100 serves primarily as a water collector and can be backwashed as needed. The fine filter 101 is in the form of an aerosol filter with permeability figures of a few micrometers less than fiber filters.

Figure 8:
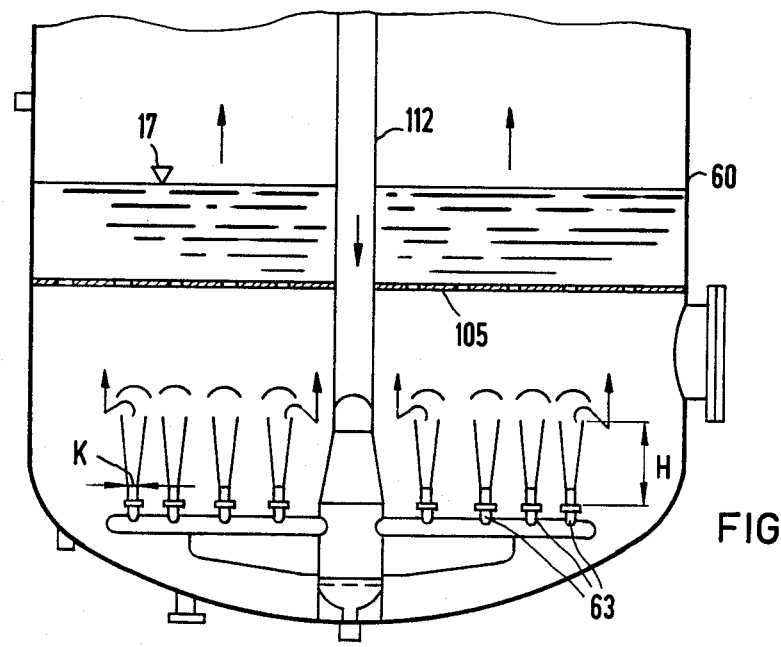
Figure 9:
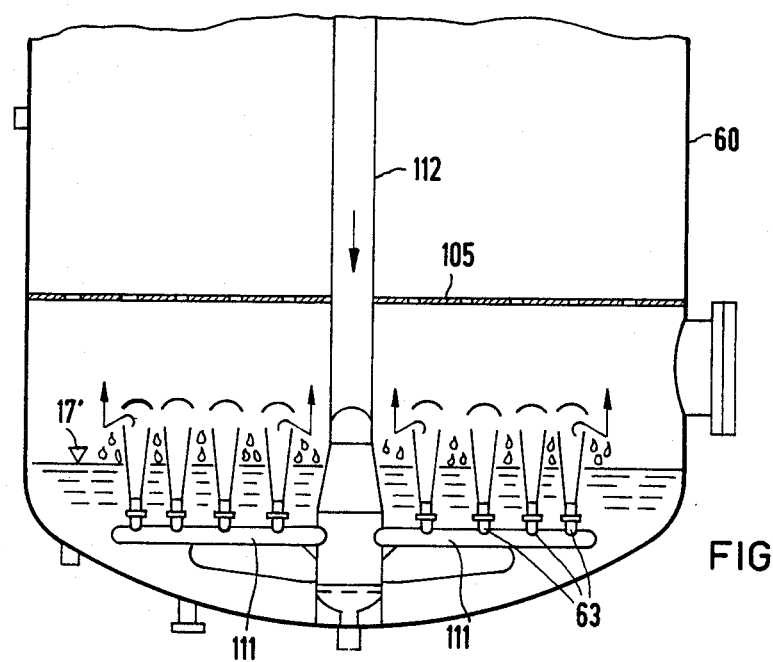

As shown in FIGS. 8 and 9, a multiplicity of the Venturi scrubbers 63 can also be mounted on horizontal tubes 111, which protrude from a central supply line tube 112 in a star pattern. The Venturi scrubbers 63 are in the form of round or rectangular Venturi tubes and have a throat width K of 3 cm and a height H of 30 cm. Small dimensions of the vessel 60 are therefore sufficient, especially if baffle filters 105 are disposed above the Venturi scrubbers 63. The baffle filters have small flowthrough openings and extend over the entire cross section of the vessel 60. The baffle filters can be disposed below the water level 17, as shown in FIG. 8. Alternatively, as shown in FIG. 9, a water level 17' can be located below the baffle filter 105, so that the Venturi tubes 63 can blow out freely without being covered by water. The baffle filters 105 also contribute to making the flow uniform over the vessel cross section.

I claim:
1. Method for pressure relief of a nuclear power plant, which comprises feeding fluid from an outlet opening of a containment through a filter to a stack, exposing the filter to pressure in the containment, filtering moisture and collecting mist at the filter, passively decreasing pressure downstream of the filter at a throttle device with a critical relaxation for a uniform throughput, and providing a pressure drop upstream of the filter which is at most half as great as a pressure drop downstream of the filter.

2. Method according to claim 1, which comprises feeding the fluid after the moisture filtering to a dry superfine filter stage in the form of a metal fiber coating substantially 2 to 4 um thick for increasing the degree of filtration and increasing the decontamination factor by substantially 1,000 to 10,000.

3. Method according to claim 1, which comprises operating the filter at an increased temperature.

4. Method according to claim 3, which comprises operating the filter at a temperature above 100° C.

5. Method according to claim 1, which comprises feeding the fluid through a wet scrubber upstream of the filter, and admixing alkaline substances for iodine absorption with washing fluid in the wet scrubber.

6. Method according to claim 1, which comprises operating the filter with a Laval throttle device downstream of the filter at pressures of more than 3 bar at a constant volume throughput independent of the pressure in the containment.

7. In a nuclear power plant having a containment with an outlet opening formed therein, a filter connected downstream of the outlet opening, and a stack connected downstream of the filter, a pressure relief apparatus comprising a pressure regulating device in the form of a throttle device operating in the vicinity of the speed of sound disposed between the filter and the stack, and a chamber downstream of said throttle device having atmospheric pressure.

8. Pressure relief apparatus according to claim 7, including a vessel, and a Venturi scrubber disposed in said vessel along with the filter.

9. Pressure relief apparatus according to claim 8, including at least one other Venturi scrubber, said Venturi scrubbers being disposed in a star pattern.

10. Pressure relief apparatus according to claim 8, including at least one other Venturi scrubber, said Venturi scrubbers having a ratio of height to throat width of no more than 20.

11. Pressure relief apparatus according to claim 8, including at least one other Venturi scrubber, said Venturi scrubbers having a ratio of height to throat width substantially equal to 10.

12. Pressure relief apparatus according to claim 8, including at least one other Venturi scrubber, said Venturi scrubbers having a maximum height of 100 cm.

13. Pressure relief apparatus according to claim 8, including at least one other Venturi scrubber, said Venturi scrubbers having a maximum throat width of 5 cm.

14. Pressure relief apparatus according to claim 8, including at least one other Venturi scrubber, said Venturi scrubbers having a maximum throat width substantially equal to 3 cm.

15. Pressure relief apparatus according to claim 8, including a baffle filter above said Venturi scrubber.

16. Pressure relief apparatus according to claim 8, including a baffle filter disposed in washing fluid above said Venturi scrubber.

17. Pressure relief apparatus according to claim 8, wherein said Venturi scrubber has a given inlet cross section, and including a flow cross section downstream of said wet scrubber being a multiple of said given inlet cross section.

18. Pressure relief apparatus according to claim 8, including means for heating said vessel.

19. Pressure relief apparatus according to claim 18, wherein said heating means are in the form of a thermosiphon line connected between said vessel and the interior of the containment.

* * * * *